United States Patent
Markoski (10) Patent No.: US 9,450,450 B2
(45) Date of Patent: Sep. 20, 2016

(54) METHOD AND APPARATUS FOR EFFICIENT FUEL CONSUMPTION

(71) Applicant: INI Power Systems, Inc., Morrisville, NC (US)

(72) Inventor: Larry J. Markoski, Raleigh, NC (US)

(73) Assignee: INI Power Systems, Inc., Morrisville, NC (US)

(*) Notice: Subject to any disclaimer, the term of this patent is extended or adjusted under 35 U.S.C. 154(b) by 0 days.

(21) Appl. No.: 14/336,361

(22) Filed: Jul. 21, 2014

(65) Prior Publication Data

US 2015/0014998 A1  Jan. 15, 2015

Related U.S. Application Data (63) Continuation of application No. 13/408,903, filed on Feb. 29, 2012, now Pat. No. 8,810,053.

(51) Int. Cl.
*F02N 11/06* (2006.01)
*H02P 9/04* (2006.01)
(Continued)

(52) U.S. Cl.
CPC ............... *H02J 7/32* (2013.01); *B60L 11/1838* (2013.01); *F02B 63/04* (2013.01); *H02J 7/0031* (2013.01); *H02J 7/0052* (2013.01); *H02J 7/0068* (2013.01); *H02J 7/1446* (2013.01); *H02J 7/041* (2013.01);
(Continued)

(58) Field of Classification Search
CPC ........ H02J 7/32; H02J 7/0068; H02J 7/0031; H02J 7/0052; H02J 7/1446; H02J 7/041; H02J 7/00; F02B 63/04; B60L 11/1838; Y02T 10/7005; Y02T 10/7011; Y02T 10/92; Y02T 90/128; Y02T 90/121; Y02T 90/14; Y02T 90/16; Y02T 90/163; H02P 9/04
USPC ................ 290/1 A, 50, 40 R, 40 B; 320/162
See application file for complete search history.

(56) References Cited

U.S. PATENT DOCUMENTS

| D10,647 S | 4/1878 | Kimberly |
| 1,467,620 A | 9/1923 | Lindsey |

(Continued)

FOREIGN PATENT DOCUMENTS

| CA | 2860584 | 7/2013 |
| CA | 2865806 | 9/2013 |

(Continued)

OTHER PUBLICATIONS

Dec. 15, 2014, U.S. Appl. No. 29/449,784.
(Continued)

*Primary Examiner* — Javaid Nasri
(74) *Attorney, Agent, or Firm* — Evan Law Group LLC (57) ABSTRACT

A method for efficient fuel consumption comprises recharging batteries or operating a device carrying out a task, with an engine through an electrical connection. The method also includes monitoring at least one of (i) current in the electrical connection, (ii) voltage of the batteries, and (iii) length of time of the recharging or task, to determine if the recharging has reach a preselected endpoint or the task has been completed. The method further includes generating a signal through a communication link to cause the engine to stop operating by: (a) preventing operation of a spark plug, (b) preventing delivery of fuel to the engine, or (c) preventing delivery of oxygen to the engine.

20 Claims, 5 Drawing Sheets

(51) Int. Cl.
*H02J 7/32* (2006.01)
*B60L 11/18* (2006.01)
*H02J 7/14* (2006.01)
*H02J 7/00* (2006.01)
*F02B 63/04* (2006.01)
*H02J 7/04* (2006.01)

(52) U.S. Cl.
CPC .............. *H02P 9/04* (2013.01); *Y02T 10/7005* (2013.01); *Y02T 10/7011* (2013.01); *Y02T 10/7072* (2013.01); *Y02T 10/92* (2013.01); *Y02T 90/121* (2013.01); *Y02T 90/128* (2013.01); *Y02T 90/14* (2013.01); *Y02T 90/16* (2013.01); *Y02T 90/163* (2013.01)

(56) References Cited

U.S. PATENT DOCUMENTS

| | | | |
|---|---|---|---|
| 1,573,641 | A | 2/1926 | Hunt |
| 1,792,785 | A | 2/1931 | Upton et al. |
| 1,835,490 | A | 12/1931 | Hesselman |
| 2,211,690 | A | 8/1940 | Edwards |
| 2,503,490 | A | 4/1950 | Robert |
| 2,520,226 | A | 8/1950 | Smith |
| 2,986,135 | A | 5/1961 | Clark et al. |
| 2,995,127 | A | 8/1961 | Orr |
| 3,593,023 | A | 7/1971 | Dodson et al. |
| 3,760,781 | A | 9/1973 | Boldt |
| 3,966,330 | A | 6/1976 | Ridler et al. |
| 4,109,193 | A | 8/1978 | Schultheis |
| 4,221,206 | A | 9/1980 | Haas |
| 4,374,508 | A | 2/1983 | Pena |
| 4,386,938 | A | 6/1983 | Earle |
| 4,433,548 | A | 2/1984 | Hallstrom, Jr. |
| 4,489,680 | A | 12/1984 | Spokas et al. |
| 4,508,071 | A | 4/1985 | Drenner |
| 4,548,164 | A | 10/1985 | Ylönen et al. |
| D289,033 | S | 3/1987 | Makinson et al. |
| 4,936,280 | A | 6/1990 | Langlois |
| 4,968,941 | A | 11/1990 | Rogers |
| 5,090,967 | A | 2/1992 | Lindström |
| 5,162,662 | A | 11/1992 | Nakayama |
| 5,199,397 | A | 4/1993 | Shelef et al. |
| D340,565 | S | 10/1993 | Klopfenstein |
| 5,444,378 | A | 8/1995 | Rogers |
| 5,447,308 | A | 9/1995 | Girard |
| 5,458,350 | A | 10/1995 | Johnson et al. |
| 5,555,853 | A | 9/1996 | Bowen et al. |
| 5,566,745 | A | 10/1996 | Hill et al. |
| D379,640 | S | 6/1997 | Gilbert |
| 5,794,601 | A | 8/1998 | Pantone |
| D417,651 | S | 12/1999 | Ohsumi |
| D420,465 | S | 2/2000 | Cascio |
| 6,100,599 | A | 8/2000 | Kouchi et al. |
| 6,112,635 | A | 9/2000 | Cohen |
| D437,825 | S | 2/2001 | Imai |
| 6,564,556 | B2 | 5/2003 | Ginter |
| 6,581,375 | B2 | 6/2003 | Jagtoyen et al. |
| D477,569 | S | 7/2003 | Iwatate et al. |
| 6,739,289 | B2 | 5/2004 | Hiltner et al. |
| D518,771 | S | 4/2006 | Xiao |
| D520,948 | S | 5/2006 | Xiao |
| 7,049,707 | B2 | 5/2006 | Wurtele |
| D532,748 | S | 11/2006 | Disbennett et al. |
| 7,161,253 | B2 | 1/2007 | Sodemann et al. |
| 7,183,746 | B1 | 2/2007 | Carter |
| 7,302,795 | B2 | 12/2007 | Vetrovec |
| D594,819 | S | 6/2009 | Yamamoto et al. |
| D597,485 | S | 8/2009 | Ma |
| 7,690,336 | B2 | 4/2010 | Bowman et al. |
| 7,695,049 | B2 | 4/2010 | Colborne |
| 7,765,794 | B2 | 8/2010 | Alexander |
| 7,849,680 | B2 | 12/2010 | Shaff et al. |
| 7,893,658 | B2 | 2/2011 | Bhardwaj |
| D633,443 | S | 3/2011 | Wang et al. |
| 8,061,121 | B2 | 11/2011 | Haugen |
| D650,739 | S | 12/2011 | Cai |
| 8,100,093 | B2 | 1/2012 | Morgenstern |
| D662,881 | S | 7/2012 | He et al. |
| 8,567,354 | B2 | 10/2013 | Kealy et al. |
| 8,601,772 | B2 | 12/2013 | Turpin et al. |
| 8,698,451 | B2 | 4/2014 | King et al. |
| 8,810,053 | B2 * | 8/2014 | Markoski ..................... 290/40 R |
| D733,052 | S | 6/2015 | Markoski et al. |
| 2001/0047777 | A1 | 12/2001 | Allen |
| 2002/0148221 | A1 | 10/2002 | Jagtoyen et al. |
| 2004/0004356 | A1 | 1/2004 | Akimoto et al. |
| 2004/0221828 | A1 | 11/2004 | Ries-Mueller et al. |
| 2010/0019729 | A1 | 1/2010 | Kaita et al. |
| 2010/0201328 | A1 | 8/2010 | Monsive, Jr. |
| 2011/0114068 | A1 | 5/2011 | Habing et al. |
| 2011/0168128 | A1 | 7/2011 | Bradley et al. |
| 2012/0012574 | A1 | 1/2012 | Vandrak et al. |
| 2012/0291420 | A1 | 11/2012 | Kim et al. |
| 2013/0131966 | A1 | 5/2013 | Hirano |
| 2013/0152898 | A1 | 6/2013 | Ki et al. |
| 2013/0158837 | A1 | 6/2013 | Jung et al. |
| 2013/0168969 | A1 | 7/2013 | Markoski |
| 2013/0221684 | A1 | 8/2013 | Markoski |
| 2015/0014998 | A1 | 1/2015 | Markoski |
| 2015/0034025 | A1 | 2/2015 | Markoski et al. |

FOREIGN PATENT DOCUMENTS

| | | |
|---|---|---|
| CN | 200952429 Y | 9/2007 |
| CN | 102104280 | 6/2011 |
| DE | 10 2009 052 571 A1 | 5/2011 |
| EP | 1 069 295 A2 | 1/2001 |
| EP | 1 383 224 A1 | 1/2004 |
| EP | 1 505 709 A2 | 2/2005 |
| FR | 2 815 486 | 4/2002 |
| FR | 2 959 888 A1 | 11/2011 |
| FR | 2 962 002 A1 | 12/2011 |
| GB | 2 184075 A | 6/1987 |
| JP | 64-32060 | 2/1989 |
| JP | 2010-236301 | 9/1998 |
| JP | 11-190220 | 7/1999 |
| JP | 2001-27128 | 1/2001 |
| JP | 2003-219573 | 7/2003 |
| JP | 2003-293771 | 10/2003 |
| JP | 2003-293788 | 10/2003 |
| JP | 2004-245219 | 9/2004 |
| JP | 2006-188980 | 7/2006 |
| JP | 2008-54442 | 3/2008 |
| JP | 2008-255831 | 10/2008 |
| JP | 2010-20906 | 1/2010 |
| JP | 2010-158129 | 7/2010 |
| JP | 2011-120346 | 6/2011 |
| JP | 2011-252407 | 12/2011 |
| JP | 2012-7508 | 1/2012 |
| JP | 2012-23825 | 2/2012 |
| JP | 2012-34488 | 2/2012 |
| JP | 2010-279107 | 12/2012 |
| WO | WO 95/26464 | 10/1995 |
| WO | WO 2011/015731 A1 | 2/2011 |
| WO | WO 2012/005021 | 1/2012 |
| WO | WO 2012/011568 | 1/2012 |
| WO | WO 2013/103532 A1 | 7/2013 |
| WO | WO 2013/103542 A2 | 7/2013 |
| WO | WO 2013/130533 | 9/2013 |

OTHER PUBLICATIONS

Dec. 31, 2014, U.S. Appl. No. 14/370,374.
Honda Owner's Manual Generator EU1000i, 92 pages, (2008).
Options for Generators and Welders, located at www.hondapowerequipment.com/pdf/Accessories/ml.repap44a.generators.pdf, 15 pages, downloaded Oct. 1, 2011.
Yamaha Inverter EF2000iS Specifications, located at www.yamaha-motor.com/outdoor/products/modelspecs_pdf.aspx?ls=outdoor&mid=626&showprevmodel=0, 1 page, downloaded Oct. 2011.
Yamaha Inverter EF1000iS Specifications, located at www.yamaha-motor.com/outdoor/products/modelspecs_pdf.aspx?ls=outdoor&mid=442&showprevmodel=0, 1 page, downloaded Oct. 2011.

(56) References Cited

OTHER PUBLICATIONS

Specification of Honda EU1000i, located at www.hondapowerequipment.com/products/modeldetail.aspx?page=modeldetail&section=P2GG&modelname=EU1000i&modelid=EU1000IKN, 1 page, downloaded Oct. 1, 2011.
Specification of Honda EU2000i, located at www.hondapowerequipment.com/products/modeldetail.aspx?page=modeldetail&section=P2GG&modelname=EU2000i&modelid=EU2000IKN, 1 page, downloaded Oct. 1, 2011.
Honda Power Equipment Decibels chart, located at www.hondapowerequipment.com/images/dbchart.jpg., 1 page, downloaded Oct. 1, 2011.
Yamaha Generator Owners Manual EF1000iS, 41 pages, 2004.
"Gasoline", Wikipedia, pp. 1-13, found at http://en.wikipedia.org/wiki/gasoline, printed on Dec. 4, 2012.
"Petrol-paraffin engine", Wikipedia, pp. 1-2, found at http://en.wikipedia.org/wiki/petrol-paraffin_engine, printed on Dec. 3, 2012.
Mar. 27, 2013, GB1302360.1.
Jun. 7, 2013, PCT/US2012/071042.
Mar. 15, 2013, PCT/US2012/070849.
Aug. 14, 2013, GB1302360.1.
Sep. 12, 2013, U.S. Appl. No. 13/343,597.
Nov. 21, 2013, PCT/US13/27922.
Jan. 27, 2014, PCT/US13/27922.
Jan. 31, 2014, GB1302360.1.
Dec. 12, 2013, 256526.
Jan. 15, 2014, U.S. Appl. No. 13/343,597.
Jan. 6, 2014, U.S. Appl. No. 13/408,903.
Feb. 28, 2014, U.S. Appl. No. 13/408,903.
Feb. 12, 2014, 201330438963.6.
Apr. 16, 2014, U.S. Appl. No. 13/408,903.
Jul. 17, 2014, PCT/US2012/070849.
Aug. 4, 2014, PCT/US2012/071042.
Aug. 28, 2014, PCT/US2012/071042.
Sep. 12, 2014, PCT/US13/27922.
Sep. 30, 2014, U.S. Appl. No. 13/343,597.
United Kingdom Search and Examination Report dated Mar. 27, 2013 for GB application No. GB1302360.1, 10 pages.
Mar. 5, 2015, U.S. Appl. No. 13/343,597.
U.S. Appl. No. 29/522,542, filed Mar. 31, 2015.
PCT Search Report dated Nov. 21, 2013 for PCT application No. PCT/US2013/027922.
Jun. 16, 2015, U.S. Appl. No. 14/370,374.
Jun. 22, 2015, U.S. Appl. No. 13/343,597.
Jun. 26, 2015, U.S. Appl. No. 14/370,374.
May 26, 2015, 201380014569.7.
Jul. 30, 2015, U.S. Appl. No. 13/343,597.
Sep. 16, 2015, U.S. Appl. No. 14/370,374.
Jan. 19, 2015, 233473.
Feb. 12, 2015, 2014-551271.
Mar. 2, 2015, 2014-559960.
Mar. 9, 2015, U.S. Appl. No. 29/449,784.
Feb. 25, 2015, U.S. Appl. No. 14/370,374.
International Search Report dated Mar. 15, 2013 for PCT application No. PCT/US/2012/070849.
Translation of Japanese Office Action dated Feb. 12, 2015, 2014-551271.
Translation of Japanese Office Action dated Mar. 2, 2015, 2014-559960.

* cited by examiner

METHOD AND APPARATUS FOR EFFICIENT FUEL CONSUMPTION

BACKGROUND

Portable generators for producing electricity are well known and have been commercially available for many years. These devices typically include an internal combustion engine, are designed to generate sufficient electrical power to run one or more common household or commercial electronic devices, and typically use gasoline as fuel. They are adapted to provide alternating current (AC) electricity, through a standard two-prong or three-prong plug receiver, at 120 or 240 volts, and at 50 to 60 Hz; also common is an additional 12 volt DC power port for charging lead acid batteries. Many of these devices are not fuel injected and include a carburetor and a manual choke. Fuel is delivered to the carburetor with the aid of a fuel pump or by gravity. The carburetor mixes the fuel with air before it enters the cylinder. In the cylinder, the fuel-air mixture is ignited by a catalytic spark from a spark plug. Combustion of the fuel then drives the engine.

Diesel generators are also known. They operate in a similar fashion to gasoline generators, except a spark plug is not used to ignite the fuel-air mixture. Rather, compression of the fuel-air mixture with the cylinder causes auto-ignition and in some cases a glow-plug is added to enhance cold starting operation.

Some of the smallest commercially available portable generators include the YAMAHA Inverter EF1000iS and the HONDA EU1000i. The capacity of the fuel tanks in these types of devices is about 0.6 gallons of gasoline, allowing operation at the maximum load of around 1000 W of 4 to 6 hours, or at ¼ load for 8 to 12 hours. These generators produce less noise than larger models, having a typical sound output of 47 to 59 dB. These devices include an internal combustion engine using gasoline fuel, so they necessarily generate carbon monoxide (CO), and do not come equipped with a catalytic converter or CO safety shut down features. Thus the manufactures strongly discourage indoor use because of the danger of carbon monoxide poisoning to humans and animals.

There has been a proliferation of small portable electronic devices and electric vehicles in recent years, most of which include small onboard rechargeable batteries. Examples include laptop computers, scooters, mobile telephones, personal digital assistants, portable digital cameras, golf carts and global positioning systems. The rechargeable batteries are most commonly lithium ion and lead acid batteries, although other varieties are available. The small portable electronic devices typically include a removable power cord with a standard two-prong or three-prong plug, or a universal serial bus (USB) plug, for plugging into a corresponding plug receiver, which allows for recharging the rechargeable batteries. Also commonly available are removable power cords with a standard cigarette lighter plug, for recharging the rechargeable batteries using a cigarette lighter plug receiver in an automobile or other vehicle.

For field operation by consumers of portable appliances such as televisions and radios, and small portable electronic devices and recharging of the batteries therein, portable generators have come into common use. Although an automobile is used to get to the field location for camping or tailgating, and is therefore available for recharging batteries or for providing DC power, unless the engine and alternator are running there is a risk of draining the automobile battery, and compromising the operation or starting capacity of the automobile. If the engine is running, over extended periods of time, there will be substantial use of the gasoline from the fuel storage tank, far in excess of the amount of electricity needed to recharge batteries for small portable electronic devices. This results because the rechargeable batteries require a specific amount of time and power to recharge, and even when just idling the vehicle engine consumes far more fuel than necessary to recharge the batteries. The advantage of using a portable generator is the much greater efficiency for generating the amount of electricity needed to recharge batteries, over the period of time necessary for recharging, as compared to an automobile engine. In other words, there is a superior match between the power generation and the power consumption. However, there is still a significant mismatch between the amount of power produced by even the smallest commercially available portable generators and small portable electronic devices and the small rechargeable batteries they contain.

Often, remote field location operations are staged, first setting up a base camp, next a remote camp, and lastly individuals on foot or with only a single vehicle are sent even farther afield. Remote field location operations are therefore required to carry all supplies, especially consumable supplies, which will be needed. Not only is the total amount of supplies often minimized to reduce cost and weight, but the variety of supplies is also minimized, to reduce logistical costs and complexity in transporting materials to, and resupplying, the base camp.

To get to remote field locations, such as those in wilderness areas far away from highways, vehicles which use diesel fuel, rather than gasoline are commonly used. The supplies carried to such remote field locations only include diesel fuel, not gasoline, for the vehicles. In these cases, recharging of batteries is carried out using power generated by the vehicle, keeping the vehicle engine running while recharging the batteries or from a large 2-10 kW diesel generator carried by the vehicle. As noted above, a vehicle engine and alternator is especially inefficient for recharging small batteries. Lastly, unless constantly monitored the vehicle engine or diesel generator will continue running even if the batteries have completed recharging, continuing the consumption of diesel fuel until human intervention or until all of the fuel is consumed. Under these circumstances, the use of diesel fuel and a generator or vehicle engine and vehicle alternator is particularly inefficient for recharging small batteries.

To address this inefficient use of diesel fuel in remote field location operations, other energy sources have been used, but each suffers from drawbacks. Solar power units are available, but they tend to be large and require significant set up time to spread out the solar cells for sufficient energy generation. Furthermore, sun light is only available during the day, and unpredictable cloud cover can make the availability of solar power unreliable and intermittent over the time scale of remote field location operations. Wind power is potentially available night and day, but otherwise can require similarly bulky equipment and can be similarly unreliable and intermittent.

In order to address the needs of remote field location operations for small amounts of electrical power over an extended period of time for both the operation of, and recharging of batteries within, small portable electronic devices or small electric vehicles, small portable generators including an internal combustion engine has been considered. However, such devices still suffer from many of the disadvantages of using a vehicle engine or large diesel generator. Although the use of fuel over any specific period of time is less, the small portable generators still continue to run when recharging of batteries is completed unless constantly monitored. A further disadvantage is that an additional fuel, such as gasoline, is needed since small portable generators typically do not use the same fuel as diesel vehicles, complicating the supply logistics by adding to the total amount and variety of materials.

SUMMARY

In a first aspect, the present invention is a method for efficient fuel consumption, comprising: recharging batteries or operating a device carrying out a task, with an engine through an electrical connection, while monitoring at least one of (i) current in the electrical connection, (ii) voltage of the batteries, and (iii) length of time of the recharging or task, to determine if the recharging has reach a preselected endpoint or the task has been completed; and generating a signal through a communication link to cause the engine to stop operating by: (a) preventing operation of a spark plug, (b) preventing delivery of fuel to the engine, or (c) preventing delivery of oxygen to the engine.

In a second aspect, the present invention is a method for efficient fuel consumption, comprising: recharging batteries with an engine through an electrical connection, while monitoring at least one of (i) current in the electrical connection, (ii) voltage of the batteries and (iii) length of time of the recharging, to determine if the recharging has reach a preselected endpoint; and generating a signal to a user indicating that the preselected endpoint has been reached. The preselected endpoint occurs when the batteries are less than 100% recharged.

In a third aspect, the present invention is a method for efficient fuel consumption, comprising: recharging batteries or operating a device carrying out a task, with an engine through an electrical connection, while monitoring at least one of (i) current in the electrical connection, (ii) voltage of the batteries and (iii) length of time of the recharging or task, to determine if the recharging has reach a preselected endpoint or the task has been completed; and generating a signal to a user indicating that the preselected endpoint has been reached or the task has been completed. The signal is at least one member selected from the group consisting of a wireless message sent to an electronic device carried by the user, and sound having a volume of at least 40 dB.

In a fourth aspect, the present invention is a device for efficient fuel consumption by an engine recharging at least one battery or operating a device carrying out a task, comprising: a monitor, for monitoring a stage of recharging of the at least one battery or completion of the task, and an effector, for generating a signal when a preselected stage of recharging of the at least one battery has been reached or the task has been completed. The monitor comprises at least one member selected from the group consisting of an ammeter and a volt meter.

In a fifth aspect, the present invention is a device for efficient fuel consumption by an engine recharging at least one battery or operating a device carrying out a task, comprising: a monitor, for monitoring a stage of recharging of the at least one battery or completion of the task, an effector, for generating a signal when a preselected stage of recharging of the at least one battery has been reached or the task has been completed, and a communication link adapted for sending the signal from the effector to the engine, for stopping the engine.

DETAILED DESCRIPTION

In order to avoid wasting fuel, the generator or vehicle engine should be turned off once a task, such as recharging batteries or operating an electronic device, has been completed. However, having a person monitor the recharging process or a device carrying out a task can be inconvenient. The present invention makes use of the discovery that efficient fuel consumption may be realized by purposefully ending the operation of a generator or engine without requiring continuous monitoring by a person. Efficient fuel consumption is achieved by ending operation of the generator or engine when, for example, charging is competed or the first stage of recharging is completed for rechargeable batteries, or when devices have completed a task. When the operation of the generator or engine is ended may be determined by monitoring the passage of a specific amount of time, or by monitoring current, voltage and/or power flowing to a load, such as a rechargeable battery and/or an electronic device. The generator or vehicle engine may be stopped by, for example, providing a signal to a person, or automatically, for example, by stopping the flow of fuel or air to the generator or vehicle engine, or cutting power to a spark plug, for example by grounding the spark plug.

Figure 1:
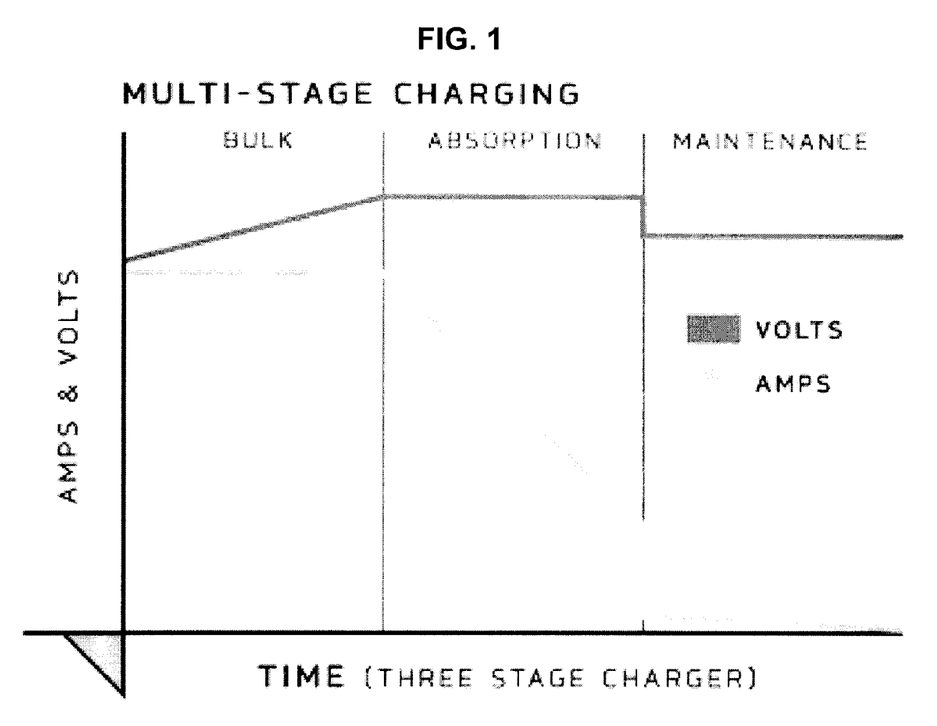
FIG. 1 is a graph showing current (amperage) and voltage versus time for recharging a battery.

FIG. 1 is a graph showing current (amperage) and voltage versus time for recharging a battery. The figure is a qualitative diagram for a lead acid battery, but almost any rechargeable batter, such as a lithium ion battery or nickel cadmium battery, will exhibit similar stages. The three stages are labeled bulk (the first stage), absorption (the second stage) and maintenance (the third stage). When any battery is recharged from a state when less than 75%, preferably less than 50%, most preferably less than 25%, including less than 5%, of the total amount of energy which the battery can store is left available in the battery, it will typically first go through the bulk stage of recharging, followed by the absorption stage of recharging. The final stage, maintenance, will be entered just before, or just after, the battery is fully recharged. For any rechargeable battery, the characteristic voltage, current and/or power consumption of each of the stages may be easily determined by monitoring one or more of these characteristics in the electrical connection between a power source, such as a generator or vehicle engine, and a battery which is being recharged from a discharged state.

As illustrated in FIG. 1, the first stage of recharging consumes the most power. The current flowing to the battery is the greatest during this stage, and the voltage typically increases gradually towards a maximum value reached during recharging. Since the most power is consumed during this stage of recharging, the power output of a generator or vehicle engine will be most closely matched with the power consumed by the recharging process. Fuel is most efficiently consumed during this stage of recharging. This stage is completed, for example, when the battery is about 90% recharged.

As illustrated in FIG. 1, the second stage of recharging, absorption, exhibits a significant drop in current, and voltage will be steady or almost steady at a maximum value. The amount of power consumed during this stage is significantly less than the amount of power consumed during the first stage, so the mismatch of the power output of a generator or vehicle engine is substantially greater than during the first stage of recharging. Fuel is much less efficiently consumed during this stage, as compared to the first stage of recharging. Depending on the desired efficiency of fuel consumption, it may be desirable to end recharging of a battery at a time just before, to just after, entering the second stage. This stage is completed, for example, when the battery is about 99% recharged.

As illustrated in FIG. 1, the third stage of recharging, maintenance, exhibits a further significant drop in current; voltage may also drop during maintenance (as illustrated) or voltage may be maintained at or near a maximum value. The third stage is reached just before, or at the point when, a battery is fully recharged. Fuel is no longer being efficiently used or is being wasted, during this third stage of recharging. It is always desirable to end recharging of a battery a time before, to just after, entering the third stage.

Since any generator or vehicle engine may produce more power than a recharging battery consumes during any of the three stages, each stage will also have a characteristic duration for each type of battery. For any rechargeable battery, the characteristic duration of each of the three stages may easily be determined by monitoring one or more characteristics in the electrical connection between a power source, such as a generator or vehicle engine, and a battery which is being recharged from a discharged state.

Similarly, when a device has completed a task, there will be a significant decrease in the voltage or current flowing to the device. Furthermore, a device may complete a task in a characteristic period of time. Stopping the operation of the engine supplying electricity to the device when the task has completed, either based on the voltage, current or period of time, will increase efficiency.

Figure 2:
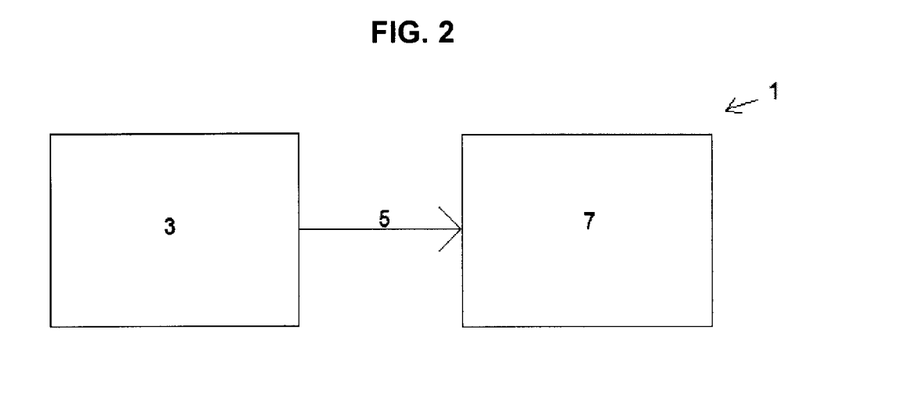
FIG. 2 illustrates a device for efficient fuel consumption.

FIG. 2 illustrates a device for efficient fuel consumption, 1. The device includes a monitor, 3, and an effector, 7, which are in communication. These two elements may be integrated together, or may be connect via an electrical connection, 5. The monitor and the effector could also be in communication through a wireless connection, or through a network connection, such as a local area network or the internet.

The monitor is the element of the device which determines when the generator or vehicle engine should be stopped, or determines the stage of the recharging operation. The monitor may monitor current flowing to the battery, and may include an ammeter, preferably an inductive ammeter; the monitor may monitor voltage of the battery, and may include a voltmeter; the monitor may monitor power consumed by the recharging operation, and may include both an ammeter and a voltmeter. Alternatively, the monitor may include a clock or timer, to measure duration to determine the stage of the recharging operation. Combinations of these devices may also be used.

The effector generates a signal to stop the operation of the generator or vehicle engine. For example, the effector may produce a sound, such as special tone or musical passage, or a noise, which indicates to a person to end the operation of the generator or vehicle engine; or the effector may send a message, such as a text message to a mobile telephone, or a message to a pager which indicates to a person carrying the mobile telephone or pager to end the operation of the generator or vehicle engine.

Alternatively, the effector may be in communication with a device which will end the operation of the generator or vehicle engine. For example, some generators and vehicles come equipped with a remote start-stop device, through which the effector may directly stop the generator or vehicle engine. Alternatively, the effector could activate a switch which stops a fuel pump or interrupts or grounds the electrical connection of a spark plug to a power source, or the effector could stop operation of a generator or vehicle engine by interrupting the supply of air or oxygen to the engine. Combinations may also be used.

The oxidation products of the internal combustion process from a generator or vehicle engine, including carbon dioxide, carbon monoxide, and some trace organics, are of concern. Accumulation of carbon monoxide, even in small amounts, is poisonous to humans and animals. Optionally, a carbon monoxide sensor may also be included in the device, 1, for detecting the level of carbon monoxide. The detector may set off an alarm when the level of carbon monoxide approaches, or reaches, a dangerous concentration. In addition to an alarm, or instead of an alarm, the carbon monoxide detector may cause the effector to notify a person, or cause the effector to directly turn off the generator or vehicle engine, when the level of carbon monoxide approaches, or reaches, a dangerous concentration.

Optionally, the device may also include the electrical connection, such as extension cord or cable, which connects the generator or vehicle engine with the load including rechargeable batteries, and/or an electrical connection to the on/off switch of the generator or vehicle engine. Each of the monitor, the effector, and/or the electrical connection of the device may include application specific integrated circuits (ASIC), electronic circuits, logic circuits, processors, computers, memory, wireless communication elements, internet connections and/or other suitable components that may execute one or more software and/or firmware programs.

Figure 3:
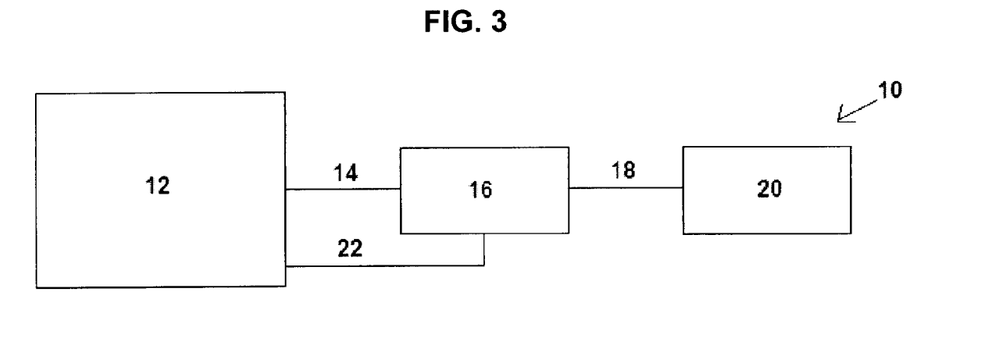
FIGS. 3-9 illustrated a variety of devices, systems and configurations for efficient fuel consumption.

FIGS. 3-9 illustrate devices, systems and configurations for efficient fuel consumption. FIG. 3 illustrate system or configuration, 10, for efficient fuel consumption. Included in the figure is fuel containing generator or vehicle, 12, and load, 20. The load may be one or more rechargeable batteries, optionally contained in or connected to one or more electronic devices. Device, 16, includes a monitor and an effector. Electrical connections, 14 and 18, electrically connect the generator or vehicle to the load; the device may also be electrically connected to the generator or vehicle, and the load, via the electrical connections, or may be sufficiently proximate to the electrical connections, for monitoring the current, voltage or power of the recharging operation. In another configuration, such as when the monitor is monitoring the duration of the recharging operation, the device may be spaced away from the electrical connections. Also illustrated is a communication link, 22, between the device and the generator or vehicle; the communication link may be an electrical connection or may be a wireless connection, for stopping the operation of the generator or vehicle engine. In operation, when the monitor within the device, 16, determines that the recharging operation is nearing the end of the first stage, or entering or beginning the second stage, the effector will cause the generator or vehicle engine to stop operation, through the communication link, 22, thereby stopping the further consumption of fuel by the generator or vehicle, 12. Alternatively, when the monitor within the device, 16, determines that the recharging operation is nearing the end of the second stage, or entering or beginning the third stage, the effector will cause the generator or vehicle engine to stop operation, through the communication link, 22, thereby stopping the further consumption of fuel by the generator or vehicle, 12.

Figure 4:
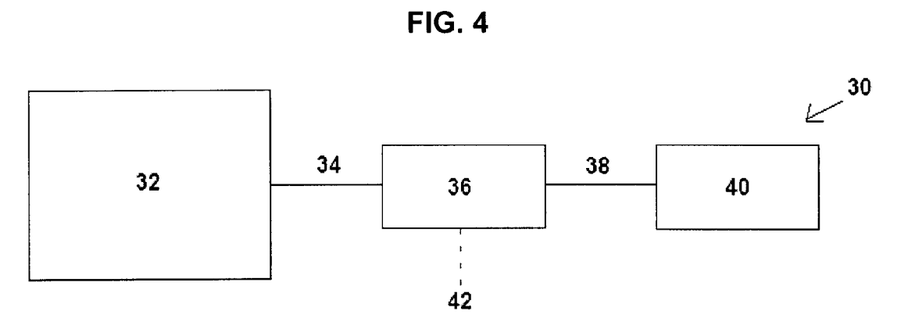

FIG. 4 illustrates system or configuration, 30, for efficient fuel consumption. Included in the figure are generator or vehicle, 32, and load, 40. The load may be one or more rechargeable batteries, optionally contained in or connected to one or more electronic devices. Device, 36, includes a monitor and an effector. Electrical connections, 34 and 38, electrically connect the generator or vehicle to the load; the device may also be electrically connected to the generator or vehicle, and the load, via the electrical connections, or may be sufficiently proximate to the electrical connections, for monitoring the current, voltage or power of the recharging operation. In another configuration, such as when the monitor is monitoring the duration of the recharging operation, the device may be spaced away from the electrical connections. Also illustrated is a person, 42, who is neither monitoring the recharging operation nor monitoring the device. In operation, when the monitor within the device, 36, determines that the recharging operation is nearing the end of the first stage, or entering or beginning the second stage, the effector will issue a sound, preferably louder than the generator or vehicle engine, for example louder than 47 to 59 dB, or send a message, such as a text message to a mobile telephone, or a message to a pager, to notify the person to turn off the generator or vehicle engine, thereby stopping the further consumption of fuel by the generator or vehicle, 32. Alternatively but less preferably, when the monitor within the device, 36, determines that the recharging operation is nearing the end of the second stage, or entering or beginning the third stage, the effector will issue a sound, preferably louder than the generator or vehicle engine, for example louder than 47 to 59 dB, or send a message, such as a text message to a mobile telephone or a message to a pager carried by the person, to notify the person to turn off the generator or vehicle engine, thereby stopping the further consumption of fuel by the generator or vehicle, 32. Preferably, the effector within the device, 36, does not use a visual signal such as a color change on a light emitting diode, emanating from the device, to notify the person. Preferably, the effector within the device, 36, does not use a quiet sound, for example having a loudness of less than 40 dB, to notify the person. The sound or signal from the device, 36, is distinct from any sound or signal issued by the load, 40, which indicates completion of recharging.

Figure 5:
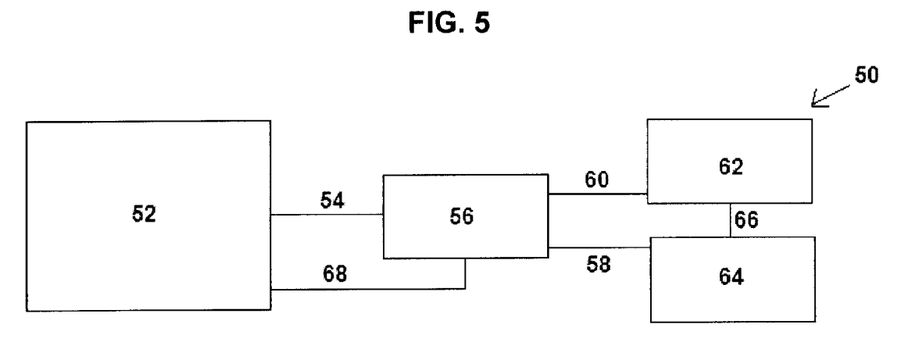

FIG. 5 illustrate system or configuration, 50, for efficient fuel consumption. Included in the figure is fuel containing generator or vehicle, 52, a load, 62, and one or more power storage batteries, 64. Preferably, the load may be one or more lithium ion or nickel cadmium rechargeable batteries, optionally contained in or connected to one or more electronic devices. Preferably, the power storage batteries are lead acid batteries. Device, 56, includes a monitor and an effector. Electrical connections, 54 and 60, electrically connect the generator or vehicle to the load, and electrical connections 54 and 58 electrically connect the generator or vehicle to the power storage batteries; the device may also be electrically connected to the generator or vehicle, the load, and the power storage batteries, via the electrical connections, or may be sufficiently proximate to the electrical connections, for monitoring the current, voltage or power of the recharging operations. Electrical connection 60 is optional. In another configuration, such as when the monitor is monitoring the duration of the recharging operation, the device may be spaced away from the electrical connections. Another electrical connection, 66, is present between the load and the power storage batteries. Also illustrated is a communication link, 68, between the device and the generator or vehicle; the communication link may be an electrical connection or may be a wireless connection, for stopping the operation of the generator or vehicle engine.

In the configuration of FIG. 5, in contrast to the configuration of FIG. 3, two recharging operations are taking place: recharging of the rechargeable batteries present in the load, 62, and the rechargeable batteries present in the power storage batteries, 64. The monitor present in the device, 56, may monitor both recharging operations, or alternatively may only monitor the recharging of the power storage batteries, 64. In operation, when the monitor within the device, 56, determines that one or both recharging operations is nearing the end of the first stage, or entering or beginning the second stage, the effector will cause the generator or vehicle engine to stop operation, through the communication link, 68, thereby stopping the further consumption of fuel by the generator or vehicle, 52. Alternatively, when the monitor within the device, 56, determines that one or both recharging operations is nearing the end of the second stage, or entering or beginning the third stage, the effector will cause the generator or vehicle engine to stop operation, through the communication link, 68, thereby stopping the further consumption of fuel by the generator or vehicle, 52.

The inclusion of the power storage batteries, 64, can improve the efficiency of the system. For example, the power output of a generator or vehicle engine will be more closely matched with the power consumed by recharging the power storage batteries alone (in the case of lead acid batteries for the power storage batteries and lithium ion batteries for the load) or the combination of the power storage batteries and the load, as compared with the power consumed by recharging the load alone. In this case, the monitor need only monitor recharging of the power storage batteries. Once the power storage batteries are recharged, either to the end of first stage or the end of the second stage, the effector may stop operation of the generator or vehicle engine; recharging of the load may be completed using power from the power storage batteries, 64, via electrical connection 66. This configuration takes advantage not only of the greater match between the power output of the generator or vehicle engine and the power storage batteries, but also the great speed with which the power storage batteries may be recharged. Preferably, the power storage batteries are separate from, and in addition to any batteries present in the generator or vehicle, 52.

Figure 6:
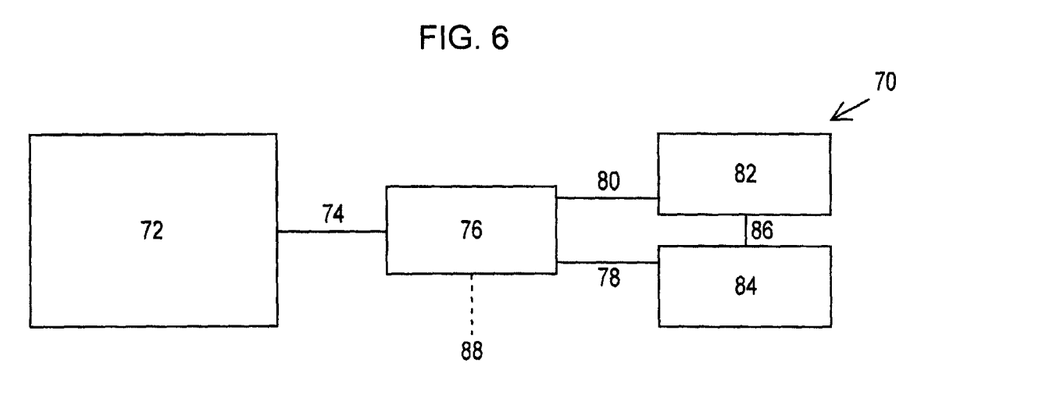

FIG. 6 illustrate system or configuration, 70, for efficient fuel consumption. Included in the figure is fuel containing generator or vehicle, 72, a load, 82, and one or more power storage batteries, 84. Preferably, the load may be one or more lithium ion or nickel cadmium rechargeable batteries, optionally contained in or connected to one or more electronic devices. Preferably, the power storage batteries are lead acid batteries. Device, 76, includes a monitor and an effector. Electrical connections, 74 and 80, electrically connect the generator or vehicle to the load, and electrical connections 74 and 78 electrically connect the generator or vehicle to the power storage batteries; the device may also be electrically connected to the generator or vehicle, the load, and the power storage batteries, via the electrical connections, or may be sufficiently proximate to the electrical connections, for monitoring the current, voltage or power of the recharging operations. Electrical connection 80 is optional. In another configuration, such as when the monitor is monitoring the duration of the recharging operation, the device may be spaced away from the electrical connections. Another electrical connection, 86, is present between the load and the power storage batteries. Also illustrated is a person, 88, who is neither monitoring the recharging operation nor monitoring the device.

In the configuration of FIG. 6, in contrast to the configuration of FIG. 4, two recharging operations are taking place: recharging of the rechargeable batteries present in the load, 82, and the rechargeable batteries present in the power storage batteries, 84. The monitor present in the device, 76, may monitor both recharging operations, or alternatively may only monitor the recharging of the power storage batteries, 84. In operation, when the monitor within the device, 76, determines that one or both recharging operations are nearing the end of the first stage, or entering or beginning the second stage, the effector will issue a sound, preferably louder than the generator or vehicle engine, for example louder than 47 to 59 dB, or send a message, such as a text message to a mobile telephone or a message to a pager carried by the person, to notify the person to turn off the generator or vehicle engine, thereby stopping the further consumption of fuel by the generator or vehicle, 72. Alternatively but less preferably, when the monitor within the device, 76, determines that one or both recharging operations are nearing the end of the second stage, or entering or beginning the third stage, the effector will issue a sound, preferably louder than the generator or vehicle engine, for example louder than 47 to 59 dB, or send a message, such as a text message to a mobile telephone, or a message to a pager, to notify the person to turn off the generator or vehicle engine, thereby stopping the further consumption of fuel by the generator or vehicle, 72. Preferably, the effector within the device, 76, does not use a visual signal such as a color change on a light emitting diode, emanating from the device, to notify the person. Preferably, the effector within the device, 76, does not use a quite sound, for example having a loudness of less than 40 dB, to notify the person. The sound or signal from the device, 76, is distinct from any sound or signal issued by the load, 82, which indicates completion of recharging.

The greater efficiency noted for the configuration of FIG. 5 is also present in the configuration of FIG. 6.

Figure 7:
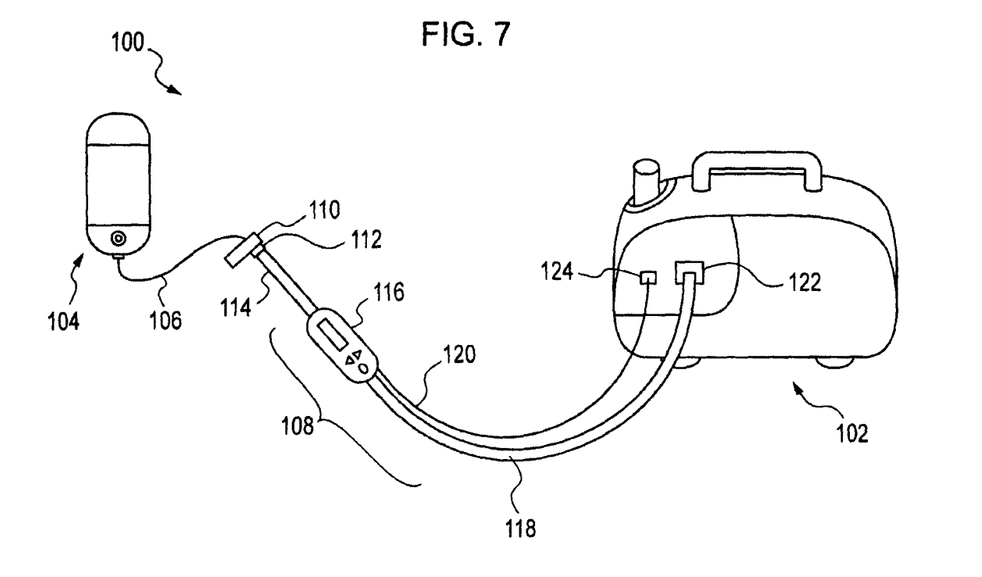

FIG. 7 illustrate system or configuration, 100, for efficient fuel consumption. Included in the figure is a fuel containing generator, 102, having a standard AC electrical outlet, 122, and on-off switch, 124. Also illustrated is a mobile telephone, 104, containing rechargeable batteries, which acts as a load. Connected to the mobile telephone is an AC adapter cord, 106, which has an AC plug, 110, which converts AC current to DC current needed to recharge and operate the mobile telephone. A device for efficient fuel consumption, 108, is also illustrated, which includes a housing, 116, in which the monitor and effector are housed. The device also includes an electrical cable, 114, having an AC outlet, 112, which receives the AC plug, and is connected to the housing, which is electrically connected to an electrical cable have an AC plug, 118, which plugs into the AC outlet of the generator. An electrical connection, 120, is also part of the device, which electrically connects the effector to the on-off switch of the generator. In this aspect of the device, the monitor is an ammeter which monitors the current passing through the housing, 116, from electrical cable, 118, to electrical cable, 114. When the monitor determines that the recharging operation of rechargeable batteries within the mobile telephone (which acts as the load in this configuration), have completed the first stage or second stage of recharging, then the effector sends a signal though electrical connection, 120, which causes the generator on-off switch to stop the generator. In a further different configuration, the monitor is a timer set to a time corresponding to the amount of time for completing the first stage or second stage of recharging, then the effector sends a signal though electrical connection, 120, which causes the generator on-off switch to stop the generator.

Figure 8:
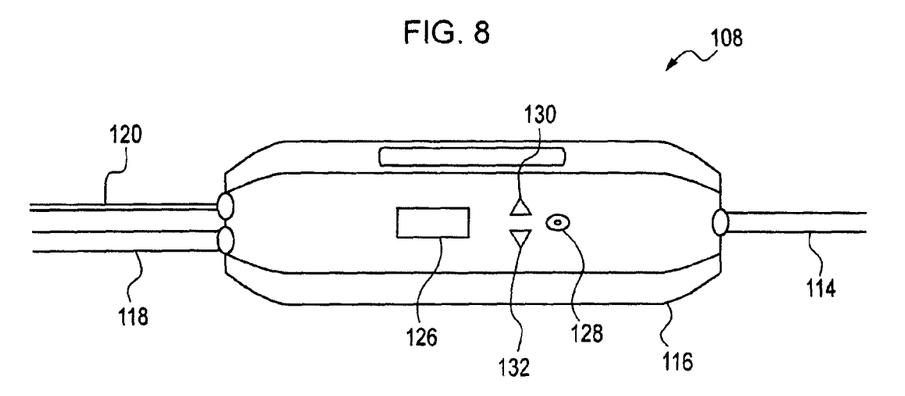

FIG. 8 illustrates externally visible parts of the device, 108, in greater detail. In addition to those elements shown in FIG. 7 (including the electrical cables, 114 and 118, the electrical connection, 120, and the housing, 116), FIG. 8 also shows a display, 126, for providing information to the user, such as in which stage of recharging the device will cause the recharging operation to end, and/or the type of batteries being recharges. Also shown are buttons, 130 and 132, for selecting which type of batteries are to be recharged, and/or in which stage of recharging the device will cause the recharging operation to end. Lastly, button, 128, may be used to turn the device on and off.

Optionally, button, 128, may be used to mark the end-point of recharging or the end-point for a device completing a task. For example, a battery charging device, without the batteries or with fully charged batteries, may be connected to the device, 108, while the generator, 102, is running; the button, 128, is then depressed to set the current or voltage which corresponds to the end-point of the recharging operation. In another example, a device which has completed a task, may be connected to the device, 108, while the generator, 102, is running; the button, 128, is then depressed to set the current or voltage which corresponds to completion of the task.

Figure 9:
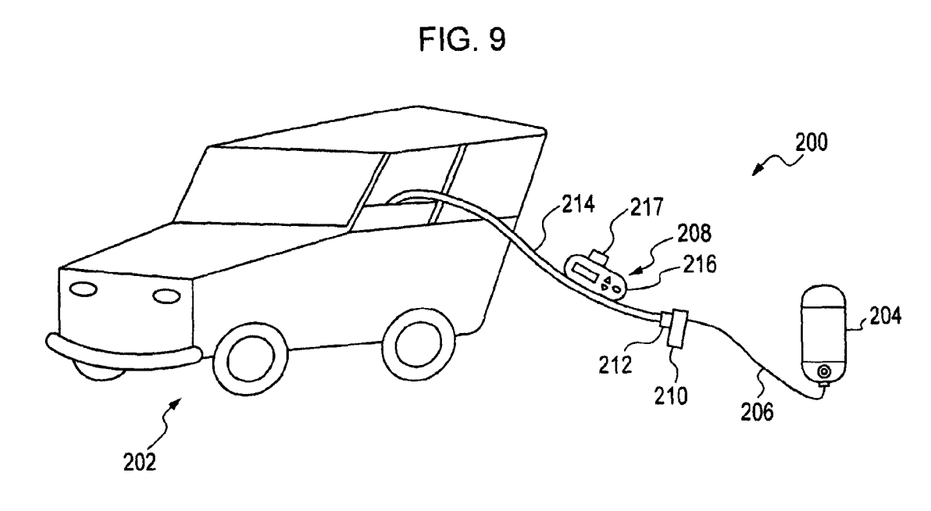

FIG. 9 illustrate another system or configuration, 200, for efficient fuel consumption. Included in the figure are a vehicle, 202, having a diesel engine, and an electrical cable, 214, which is plugged into the cigarette lighter (not shown) of the vehicle. The electrical cable has an AC outlet, 212, into which is plugged an AC plug, 210, which is connected to an AC adapter cord, 206, which is in turn connected to a mobile telephone (which acts as the load), 204, containing rechargeable batteries. Also illustrated is a device for efficient fuel consumption, 208, which has a housing, 216, and vehicle remote start-stop, 217, for the vehicle, 202. In the configuration illustrated in FIG. 9, the device, 208, does not include the electrical cable which electrically connects the vehicle to the mobile telephone. However, the device does include a monitor which includes an inductive ammeter; during operation the inductive ammeter is placed around and in proximity to the electrical cable, 214, so that it can monitor the current flowing through the cable. The device also include an effector, which includes the vehicle remote start-stop, 217: when the monitor determines that the recharging operation has completed the first stage, or has completed the second stage, it causes the effect to stop the diesel engine of the vehicle. In a further different configuration, the vehicle remote start-stop is replaced with a speaker for generating a loud sound; when the monitor determines that the recharging operation has completed the first or second stage, the speaking generates a loud sound sufficient to notify a person to turn off the engine of the vehicle.

The devices and systems described herein may be, or include, application specific integrated circuits (ASIC), electronic circuits, logic circuits, processors, computers, memory, wireless communication elements, internet connections and/or other suitable components that may execute one or more software and/or firmware programs, that provide the described functionality.

What is claimed is:

1. A method for efficient fuel consumption, comprising:
recharging batteries with an engine through an electrical connection, while monitoring at least one of (i) current in the electrical connection; (ii) voltage of the batteries, and (iii) length of time of the recharging, to determine if the recharging has reached a preselected endpoint; and
generating a signal through a communication link to cause the engine to stop operating when the preselected endpoint is reached by: (a) preventing operation of a spark plug, (b) preventing delivery of fuel to the engine, or (c) preventing delivery of oxygen to the engine,
wherein the preselected endpoint occurs when the batteries are less than 100% recharged.

2. The method of claim 1, wherein the engine is a diesel engine.

3. The method of claim 1, wherein the engine is the engine of a vehicle.

4. The method of claim 1, wherein the engine is not the engine of a vehicle.

5. The method of claim 1, wherein the monitoring is monitoring the voltage of the batteries.

6. The method of claim 1, wherein the signal causes the engine to stop operating by preventing a spark plug from operating.

7. The method of claim 1, wherein the monitoring is monitoring the current in the electrical connection.

8. The method of claim 1, wherein the monitoring is of the length of time of the recharging.

9. The method of claim 1, wherein the preselected endpoint occurs when the recharging has completed a bulk charging stage.

10. The method of claim 1, wherein the preselected endpoint occurs when the recharging is in an absorption charging stage.

11. A method for efficient fuel consumption, comprising:
recharging batteries with an engine through an electrical connection, while monitoring at least one of (i) current in the electrical connection, (ii) voltage of the batteries and (iii) length of time of the recharging, to determine if the recharging has reached a preselected endpoint; and
generating a signal to a user indicating that the preselected endpoint has been reached;
wherein the signal is at least one member selected from the group consisting of a wireless message sent to an electronic device carried by the user, and sound having a volume of at least 40 dB, and
the preselected endpoint occurs when the batteries are less than 100% recharged.

12. The method of claim 11, wherein the engine is a diesel engine.

13. The method of claim 11, wherein the engine is the engine of a vehicle.

14. The method of claim 11, wherein the engine is not the engine of a vehicle.

15. The method of claim 11, wherein the signal is a wireless signal sent to a device carried by the user.

16. The method of claim 11, wherein the monitoring is monitoring the current in the electrical connection.

17. The method of claim 11, wherein the signal is a sound.

18. The method of claim 11, wherein the monitoring is of the length of time of the recharging.

19. The method of claim 11, wherein the preselected endpoint occurs when the recharging has completed a bulk charging stage.

20. The method of claim 11, wherein the preselected endpoint occurs when the recharging is in an absorption charging stage.

* * * * *

UNITED STATES PATENT AND TRADEMARK OFFICE
CERTIFICATE OF CORRECTION

PATENT NO. : 9,450,450 B2
APPLICATION NO. : 14/336361
DATED : September 20, 2016
INVENTOR(S) : Larry J. Markoski It is certified that error appears in the above-identified patent and that said Letters Patent is hereby corrected as shown below:

Page 2. References Cited, Foreign Patent Documents

Column 2, Line 41, please delete "2010-236301" and insert --10-236301--

Column 2, Line 58, please delete "12/2012" and insert --12/2010--

Page 3. References Cited, Other Publications

Column 2, Line 10, please delete "Mar." and insert --May--

Signed and Sealed this
Thirteenth Day of February, 2018

Andrei Iancu
*Director of the United States Patent and Trademark Office*